(12) United States Patent
Hirooka

(10) Patent No.: US 9,786,462 B2
(45) Date of Patent: Oct. 10, 2017

(54) MASTER CONTROLLER

(71) Applicant: TOYO ELECTRIC MFG. CO., LTD., Chuou-ku, Tokyo (JP)

(72) Inventor: Masatoshi Hirooka, Yokohama (JP)

(73) Assignee: TOYO ELECTRIC MFG. CO., LTD., Chuou-ku, Tokyo (JP)

( * ) Notice: Subject to any disclaimer, the term of this patent is extended or adjusted under 35 U.S.C. 154(b) by 0 days.

(21) Appl. No.: 15/127,880

(22) PCT Filed: Jan. 14, 2015

(86) PCT No.: PCT/JP2015/000137
§ 371 (c)(1),
(2) Date: Sep. 21, 2016

(87) PCT Pub. No.: WO2015/145922
PCT Pub. Date: Oct. 1, 2015

(65) Prior Publication Data
US 2017/0092455 A1    Mar. 30, 2017

(30) Foreign Application Priority Data
Mar. 26, 2014   (JP) .................. 2014-063979

(51) Int. Cl.
| B23K 11/24 | (2006.01) |
| H01H 89/00 | (2006.01) |
| H01H 21/22 | (2006.01) |
| H01H 3/42 | (2006.01) |

(52) U.S. Cl.
CPC .............. H01H 89/00 (2013.01); H01H 3/42 (2013.01); H01H 21/22 (2013.01)

(58) Field of Classification Search
CPC ........... H01H 89/00; H01H 3/42; H01H 21/22
See application file for complete search history.

(56) References Cited

U.S. PATENT DOCUMENTS

| 4,697,124 A | 9/1987 | Schmitz |
| 2012/0077394 A1* | 3/2012 | Banks ................. B63H 21/213 440/1 |

FOREIGN PATENT DOCUMENTS

| JP | S62293909 A | 12/1987 |
| JP | H10144196 A | 5/1998 |
| JP | H11215616 A | 8/1999 |
| JP | 2001197601 A | 7/2001 |

(Continued)

OTHER PUBLICATIONS

Sep. 27, 2016, International Preliminary Report on Patentability issued in the International Patent Application No. PCT/JP2015/000137.

(Continued)

*Primary Examiner* — Daniel Cavallari
(74) *Attorney, Agent, or Firm* — Kenja IP Law PC

(57) ABSTRACT

Provided is a master controller that can be adopted in a variety of vehicles in which different current capacities are required for the master controller. A master controller includes a handle (3), cams (2*a* to 2*f*) interlocking with the handle (3), cam switches (1*a* to 1*f*) connected to or disconnected from the cams (2*a* to 2*f*) in accordance with the position of the handle (3), and a relay circuit (6) that outputs output signals in accordance with input signals input through the cam switches (1*a* to 1*f*).

4 Claims, 6 Drawing Sheets

(56) References Cited

FOREIGN PATENT DOCUMENTS

JP 2014018053 A 1/2014

OTHER PUBLICATIONS

Feb. 24, 2015, International Search Report issued in the International Patent Application No. PCT/JP2015/000137.
Toyo Denki Seizo K. K., "Toyo Denki Seizo Technical Report", Mar. 2011, No. 123, p. 36.

* cited by examiner

MASTER CONTROLLER

CROSS-REFERENCE TO RELATED APPLICATION

This application claims priority to and the benefit of Japanese Patent Application No. 2014-063979 filed Mar. 26, 2014, the entire contents of which are incorporated herein by reference.

TECHNICAL FIELD

This disclosure relates to a master controller that includes a cam.

BACKGROUND

A master controller for instructing a control device that controls the motor of a railroad vehicle, for example, has been proposed (for example, see JP 2014-18053 A (PTL 1), JP H11-215616 A (PTL 2), and "Toyo Denki Seizo Technical Report", Toyo Denki Seizo K. K., March 2011, No. 123, p. 36 (NPL 1)).

For example, FIG. 4 is a schematic cross-sectional diagram of a typical master controller for a railroad vehicle. The body 107 of the master controller illustrated in FIG. 4 has six positions (notch positions), "off" and "1" to "5", that are selected by the driver operating a handle 103. The body 107 is connected to a control device load via a connector 104 and a cable 105. The body 107 includes a plurality of cams 102a to 102f that can turn in conjunction with operation of the handle 103.

FIG. 5 is a schematic right side view of the master controller in FIG. 4. As illustrated in FIG. 5, for example when a projection 108 formed on a cam 102f contacts a cam switch 101f, an input signal is transmitted via the cam switch 101f. In this way, cam switches 101a to 101f are provided in correspondence with the cams 102a to 102f.

FIG. 6 is a circuit diagram of the master controller illustrated in FIG. 3. The locations where the handle positions are surrounded by trapezoids in the "cam development view" of FIG. 6 indicate that the cam(s) and cam switch(es) corresponding to the position of the handle 103 are in contact, and that one or more input signals are transmitted via the cam switch(es). For example, when the handle 103 is in the location corresponding to the "off" position, the cam switch 101a is closed (connected), and the other cam switches 101b to 101f are open (disconnected). When the handle 103 is in other positions as well, the cam switches 101a to 101f similarly open and close in accordance with the position.

The cam switches 101a to 101f are connected to a control device (load) of the vehicle via the connector 104 and the cable 105. The number of signals output from the connector 104 is equivalent to the number of the cam switches 101a to 101f. In the example illustrated here, six different signals are output.

In a typical master controller, such as the one provided in a large vehicle, a large current capacity is necessary for the cam switches 101a to 101f.

CITATION LIST

Patent Literature

PTL 1: JP 2014-18053 A
PTL 2: JP H11-215616 A

Non-Patent Literature

NPL 1: "Toyo Denki Seizo Technical Report", Toyo Denki Seizo K. K., March 2011, No. 123, p. 36

SUMMARY

Technical Problem

Conventionally, a cam switch having a large current capacity is large scale and occupies a large area (volume) among the components constituting the master controller body. If the master controller body is large-scale, a large space is occupied exclusively by the master controller in the cab where the master controller is installed. In this way, by installing the master controller body, the limited living space in the cab becomes cramped, placing a burden on the driver.

On the other hand, when using small-scale cam switches, the current capacity appropriate for the vehicle control device is not necessarily available, since the current capacity of small-scale cam switches is small. Therefore, it may not be possible to adopt small-scale cam switches in a variety of vehicles in which different current capacities are required. For example, in a large-scale vehicle that requires a large current capacity, it has been difficult to use a small-scale master controller.

Therefore, it would be helpful to provide a master controller that can be adopted in a variety of vehicles in which different current capacities are required for the master controller.

Solution to Problem

In order to resolve the aforementioned problem, a master controller according to this disclosure includes: a handle; a cam interlocking with the handle; a plurality of cam switches connected to or disconnected from the cam in accordance with a position of the handle; and a relay circuit configured to output a plurality of output signals in accordance with a plurality of input signals input through the plurality of cam switches.

In the master controller according to this disclosure, the relay circuit may output the plurality of output signals in one-to-one correspondence with the plurality of input signals.

In the master controller according to this disclosure, the relay circuit may be formed on a printed circuit board.

Advantageous Effect

The master controller according to this disclosure can be adopted in vehicles in which different current capacities are required for the master controller.

DETAILED DESCRIPTION

Embodiments of this disclosure are described below with reference to the drawings.

Figure 1:
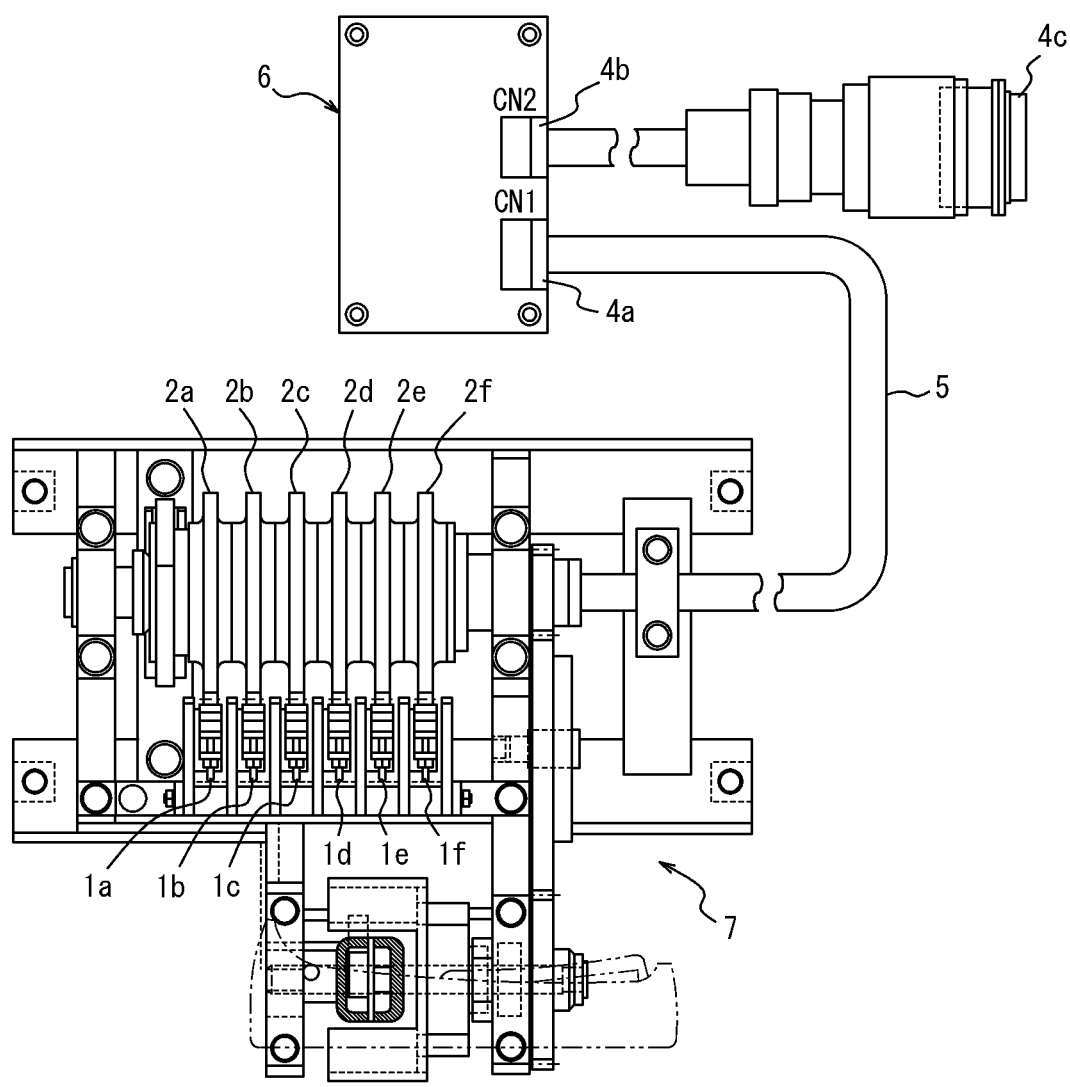
FIG. 1 is a schematic cross-sectional diagram of a master controller according to one of the disclosed embodiments.

FIG. 1 is a schematic cross-sectional diagram of a master controller according to this embodiment. The master controller includes a body 7 and a relay circuit 6 connected to the body 7 via a connector 4a and a cable 5. The body 7 has a plurality of cam switches (switches) 1a to 1f, a plurality of cams 2a to 2f, and a handle 3.

The handle 3 has a plurality of positions (notch positions) that can be switched between by driver operation. For example, the handle 3 has six positions: "off" and "1" to "5".

Figure 2:
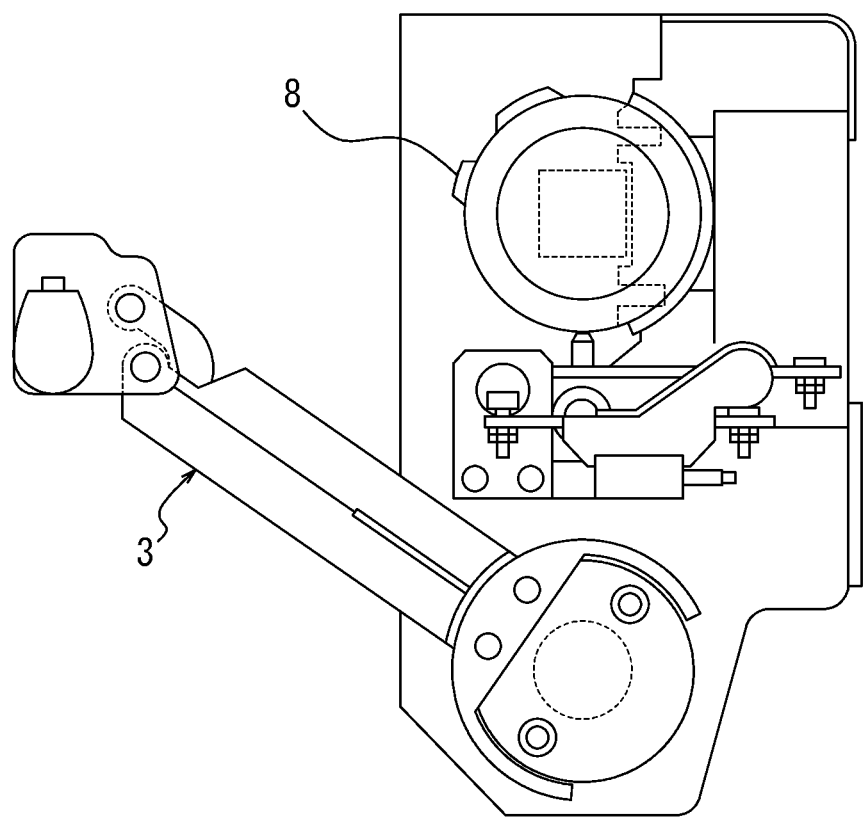
FIG. 2 is a schematic right side view of the body according to one of the disclosed embodiments.

The plurality of cams 2a to 2f are now described. The cam 2a is provided so as to be able to turn in conjunction with the handle 3. As illustrated in FIG. 2, a projection 8 that projects outward in the radial direction of the cam 2a and has a predetermined length in the circumferential direction of the cam 2a is formed on the cam 2a. In accordance with axial turning of the cam 2a, a roller of the cam switch 1a provided in correspondence with the cam 2a comes into contact with or is disconnected from the projection 8. In greater detail, the projection of the cam 2a contacts the roller of the cam switch 1a when the handle 3 is in the "off" position. The projection 8 of the cam 2a is disconnected from the roller of the cam switch 1a when the handle 3 is in the "1" to "5" positions.

Like the cam 2a, in accordance with axial turning of the cams 2b to 2f, rollers of the corresponding cam switches 1b to 1f come into contact with or are disconnected from the projections 8. For example, the projection 8 of the cam 2b contacts the roller of the cam switch 1b when the handle 3 is in the "1" to "5" positions. The projection 8 of the cam 2b is disconnected from the roller of the cam switch 1b when the handle 3 is in the "off" position. The projection 8 of the cam 2c contacts the roller of the cam switch 1c when the handle 3 is in the "2" to "5" positions. The projection 8 of the cam 2c is disconnected from the roller of the cam switch 1c when the handle 3 is in the "off" and "1" positions. The projection 8 of the cam 2d contacts the roller of the cam switch 1d when the handle 3 is in the "3" to "5" positions. The projection 8 of the cam 2d is disconnected from the roller of the cam switch 1d when the handle 3 is in the "off", "1", and "2" positions. The projection 8 of the cam 2e contacts the roller of the cam switch 1e when the handle 3 is in the "4" and "5" positions. The projection 8 of the cam 2e is disconnected from the roller of the cam switch 1e when the handle 3 is in the "off" and "1" to "3" positions. The projection 8 of the cam 2f contacts the roller of the cam switch 1f when the handle 3 is in the "5" position. The projection 8 of the cam 2f is disconnected from the roller of the cam switch 1f when the handle 3 is in the "off" and "1" to "4" positions.

The plurality of cam switches 1a to 1f are now described. The cam switch 1a (see FIG. 1) is provided in correspondence with the cam 2a. When the projection 8 of the cam 2a is in contact with the roller of the cam switch, the cam switch 1a is closed. The input signal from the body 7 is transmitted through the closed cam switch 1a. Similarly for the cam switches 1b to 1f, when the projection 8 of each of the corresponding cams 2b to 2f is in contact with the roller of the cam switches 1b to 1f, the input signal from the body 7 is input into the relay circuit 6.

The relay circuit 6 is connected to a control device power source and the control device load via connectors 4b and 4c.

Figure 3:
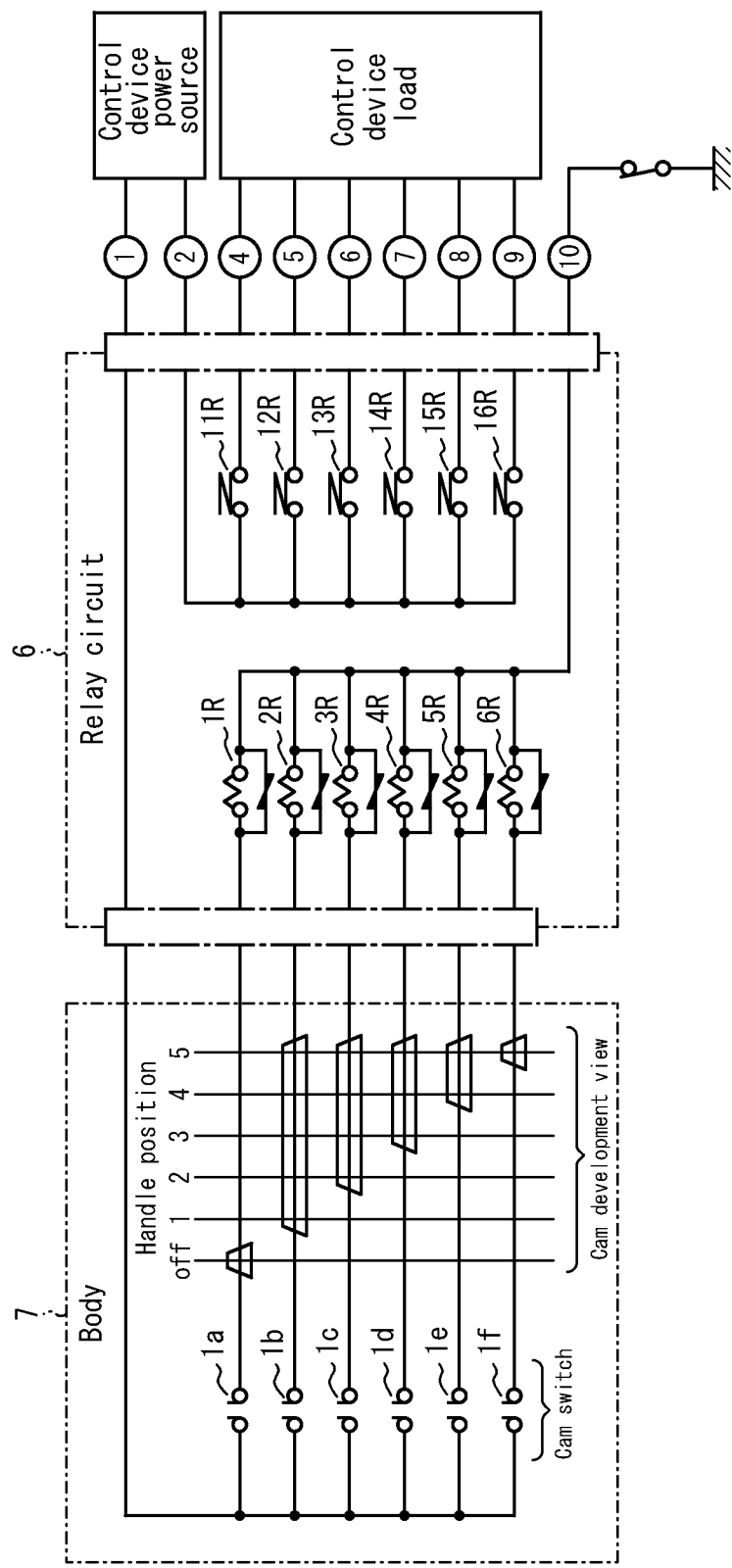
FIG. 3 illustrates a circuit in the master controller of FIG. 1.
Figure 4:
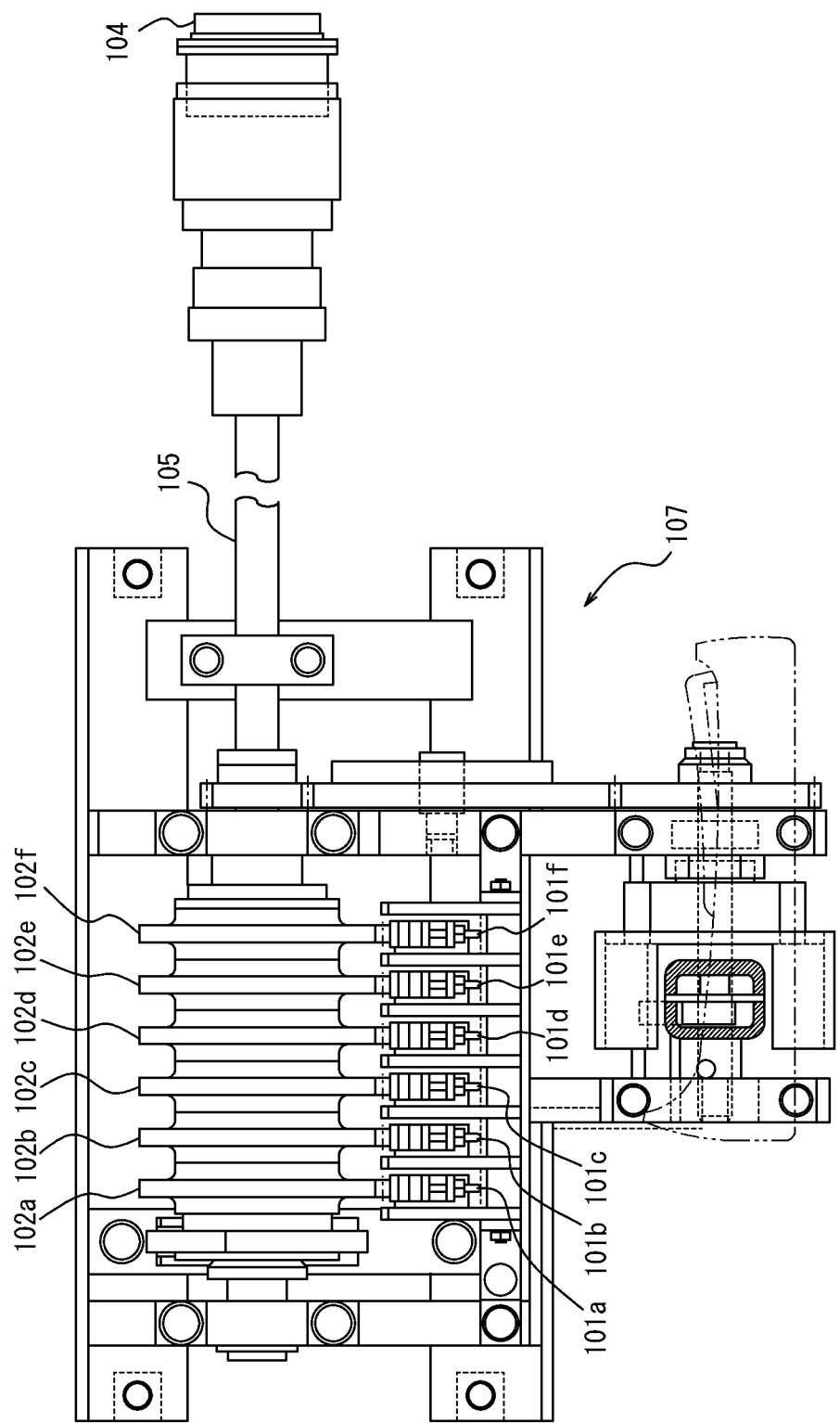
FIG. 4 is a schematic cross-sectional diagram of a typical master controller.
Figure 5:
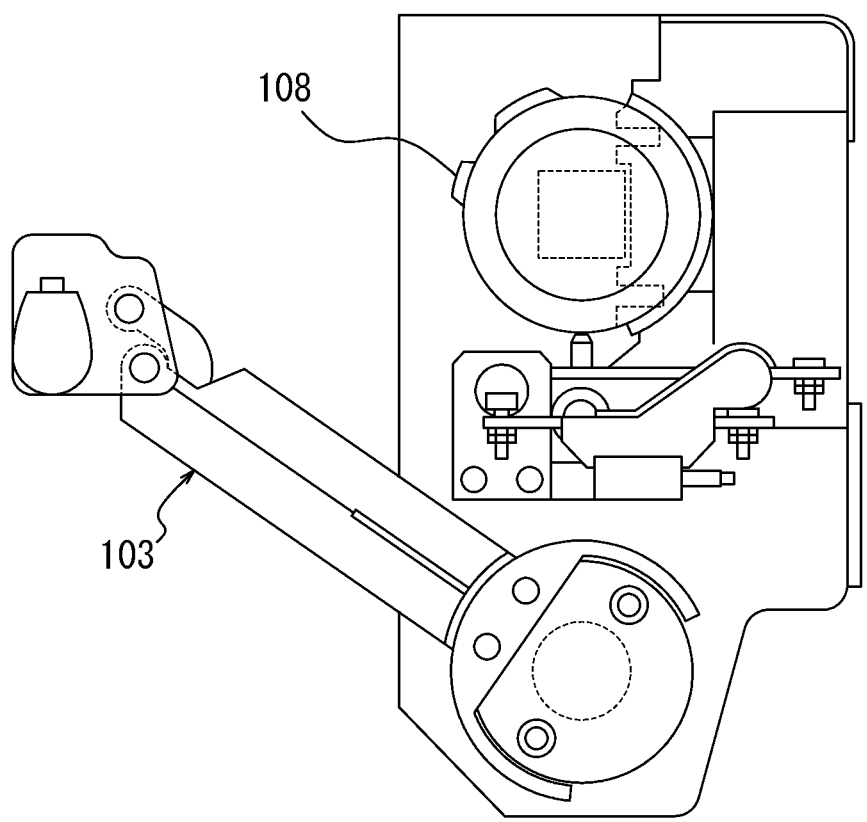
FIG. 5 is a schematic right side view of the body of a typical master controller.
Figure 6:
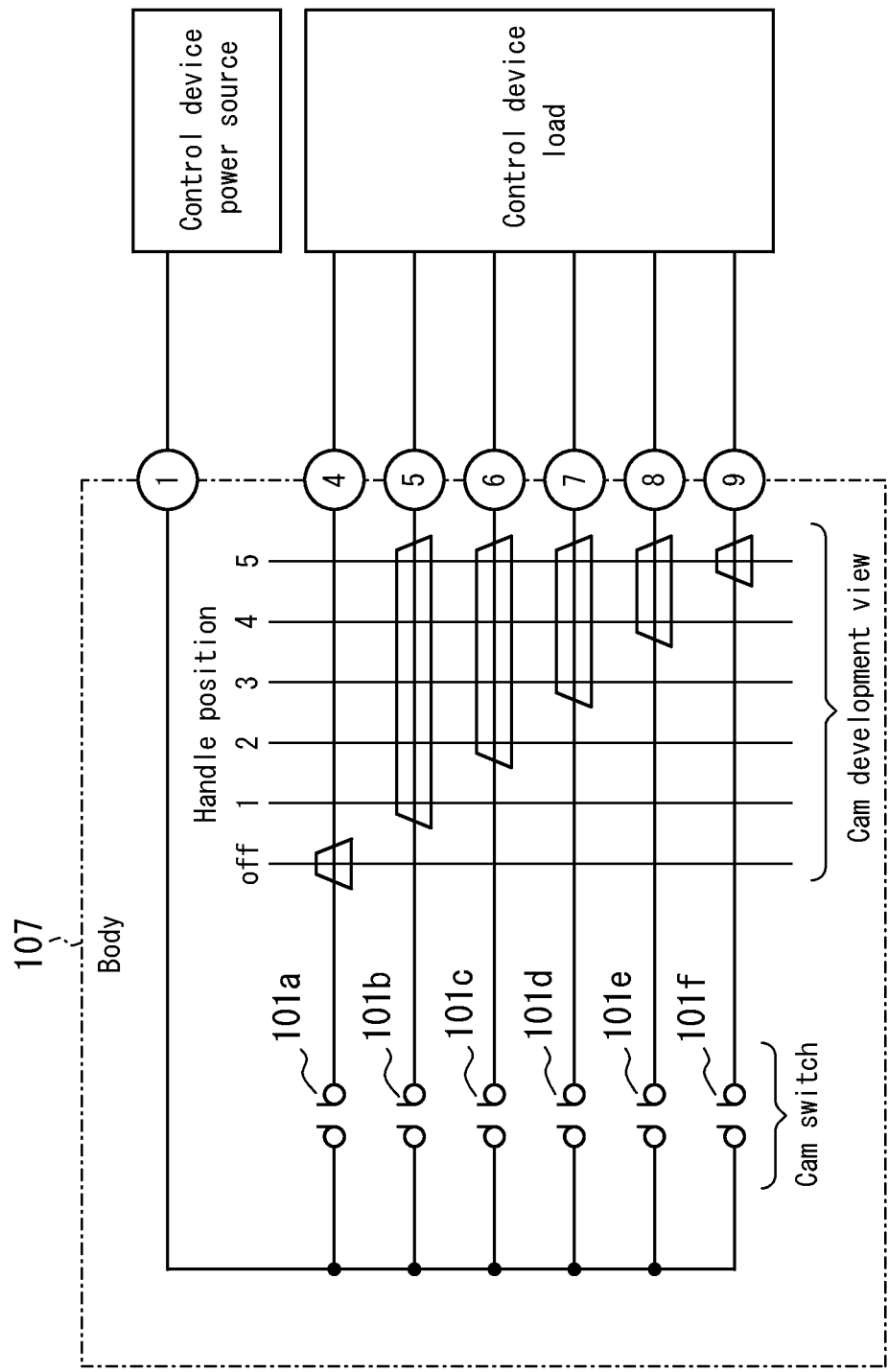
FIG. 6 illustrates a circuit in the master controller of FIG. 4.

As illustrated in FIG. 3, the relay circuit 6 has input contacts corresponding to each of the plurality of cam switches 1a to 1f. Corresponding coils 1R to 6R are disposed at the input contacts. The coils 1R to 6R are excited by the input signal from the body 7 through the cam switches 1a to 1f and close the respective contacts 11R to 16R. Through the one or more closed contacts 11R to 16R and the connector 4c, the supply power from the control device power source is output to the control device load as output signal(s) (relay output).

In this way, the relay circuit 6 of this embodiment outputs output signals in one-to-one correspondence with the six input signals (six-way system) input through the six cam switches 1a to 1f. For example, when the handle 3 is in the "off" position, the cam switch 1a is closed, and the other cam switches 1b to 1f are open. In this case, the contact 11R is closed by excitation of the coil 1R, and one output signal through the contact 11R is output. As another example, when the handle 3 is in the "3" position, the cam switches 1b to 1d are closed, and the other cam switches 1a, 1c, and 1f are open. In this case, the contacts 12R to 14R are closed by excitation of the coils 2R to 4R, and three output signals through the contacts 12R to 14R are output simultaneously.

The relay circuit 6 is preferably formed on a printed circuit board.

As described above, the master controller of this embodiment includes the relay circuit 6 between the body 7 and the control device load. The relationship between the position of the handle 3 and the output of the connector 4c in the master controller is the same as the relationship between the position of the handle 103 and the output of the connector 104 in the typical master controller. Therefore, a typical master controller can be replaced with the master controller of this embodiment without affecting operability for the driver or the interface of the equipment (control device load) connected to the connector 104. Accordingly, the master controller of this embodiment can be adopted in a plurality of vehicles in which different current capacities are required.

The control device load is connected to a later stage than the relay circuit 6, and the load current (output current) is output in accordance with opening and closing of the contacts in the relay circuit 6. Since the cam switches 1a to 1f of the body 7 are not influenced by the control device load, small-scale cam switches with a small current capacity can be adopted as the cam switches 1a to 1f of the master controller, and both the body 7 and the master controller overall can be reduced in size. Furthermore, as a result of the reduction in scale, the master controller is easier to handle for example during installation, thereby facilitating maintenance of the master controller.

The master controller overall can also be reduced further in size by forming the relay circuit 6 on a printed circuit board.

Although this disclosure is based on embodiments and drawings, it is to be noted that various changes and modifications will be apparent to those skilled in the art based on this disclosure. Therefore, such changes and modifications are to be understood as included within the scope of this disclosure.

For example, the plurality of cams 2a to 2f may be formed integrally as one cam.

Furthermore, the number of positions of the handle 3, the number of cam switches, the number of coils, and the number of contacts may be any number two or greater. The number of cam switches in the body and the number of coils and contacts in the relay circuit have been described as equally being six each, but these numbers may differ from each other.

REFERENCE SIGNS LIST

1*a-f*, 101*a-f* Cam switch
2*a-f*, 102*a-f* Cam
3, 103 Handle
4, 104 Connector
5, 105 Cable
6 Relay circuit
7, 107 Body
8, 108 Projection

The invention claimed is:

1. A master controller comprising:
a handle;
a plurality of cams interlocking with the handle;
a plurality of cam switches corresponding to the plurality of cams, the plurality of cam switches being open or closed via the plurality of cams in accordance with a position of the handle; and
a relay circuit configured to output one or more output signals simultaneously in accordance with a combination of one or more closed cam switches among the plurality of cam switches.

2. The master controller of claim 1, wherein the relay circuit comprises a plurality of contacts corresponding to the plurality of cam switches and outputs the one or more output signals simultaneously through one or more contacts corresponding to the one or more closed cam switches.

3. The master controller of claim 1, wherein the relay circuit is formed on a printed circuit board.

4. The master controller of claim 2, wherein the relay circuit is formed on a printed circuit board.

* * * * *